US012424800B1

(12) United States Patent
Jordan

(10) Patent No.: US 12,424,800 B1
(45) Date of Patent: Sep. 23, 2025

(54) POWER RETURN DELAY OUTLET ADAPTOR

(71) Applicant: Luther Jordan, Coldwater, MS (US)

(72) Inventor: Luther Jordan, Coldwater, MS (US)

( * ) Notice: Subject to any disclaimer, the term of this patent is extended or adjusted under 35 U.S.C. 154(b) by 0 days.

(21) Appl. No.: 19/053,218

(22) Filed: Feb. 13, 2025

Related U.S. Application Data

(60) Provisional application No. 63/630,583, filed on Feb. 15, 2024.

(51) Int. Cl.
*H01R 13/70* (2006.01)
*H01R 13/04* (2006.01)
*H01R 13/10* (2006.01)
*H01R 13/717* (2006.01)
*H01R 25/00* (2006.01)
*H01R 103/00* (2006.01)

(52) U.S. Cl.
CPC ........... *H01R 13/701* (2013.01); *H01R 13/04* (2013.01); *H01R 13/10* (2013.01); *H01R 13/717* (2013.01); *H01R 25/006* (2013.01); *H01R 2103/00* (2013.01)

(58) Field of Classification Search
None
See application file for complete search history.

(56) References Cited

U.S. PATENT DOCUMENTS 5,700,150 A * 12/1997 Morin .................. H01R 25/003 439/4
6,122,157 A 9/2000 Gerlach
6,971,920 B2 12/2005 Crupi
7,651,365 B2 * 1/2010 Chien ...................... H02G 3/14 439/490
8,464,078 B2 6/2013 Brooks et al.
8,896,150 B1 11/2014 Shammoh
9,948,037 B2 * 4/2018 Ashby .................. H01R 13/719
2009/0156061 A1 6/2009 Bernstein
2010/0038218 A1 * 2/2010 Fisher .................... H01R 13/70 200/550
2014/0028097 A1 * 1/2014 Augur ........................ H02J 3/14 307/39
2016/0285310 A1 * 9/2016 Tan ................... H02J 13/00001
(Continued)

FOREIGN PATENT DOCUMENTS

WO WO-2019218021 A1 * 11/2019 ........... H01R 25/006
WO 2020234865 A1 11/2020

*Primary Examiner* — Tho D Ta
(74) *Attorney, Agent, or Firm* — Invention To Patent Services; Alex Hobson

(57) ABSTRACT

A power return delay outlet adaptor system prevents damage to electrical devices, such as electrical appliances from power irregularities that often follow a power outage and upon a return of power following the outage. A power return delay outlet adaptor plugs into a power receptacle and has one or more power sockets. A power socket of the power return delay outlet adaptor is a power return delay socket that is coupled with a delay on make device. The delay on make device includes a power sensor and a switch that is opened upon the power sensor detecting a power outage to the power return delay outlet adaptor. The open switch prevents power supply to the power return delay socket. The delay on make device then only closes the switch after a delay time following a return of power to the power return delay outlet adaptor.

20 Claims, 6 Drawing Sheets

(56) References Cited

U.S. PATENT DOCUMENTS

| | | | | |
|---|---|---|---|---|
| 2018/0316145 | A1* | 11/2018 | Mckiernan | H01R 25/006 |
| 2023/0082551 | A1* | 3/2023 | Hu | B60L 53/63 174/50 |

* cited by examiner

PRIOR ART

POWER RETURN DELAY OUTLET ADAPTOR

CROSS REFERENCE TO RELATED APPLICATIONS

This application claims the benefit of priority to U.S. provisional patent application No. 63/630,583, filed on Feb. 15, 2024; the entirety of which is hereby incorporated by reference.

BACKGROUND OF THE INVENTION

Field of the Invention

The invention relates to a power return delay outlet adaptor that is configured to prevent power irregularities from damaging electrical devices after a power outage and incorporates a delay on make device in an outlet adaptor to prevent power supply to at least one supply socket of the power return delay outlet adaptor for a delayed period of time after power has returned following a power outage.

Background

Power outages are common in many areas due to weather, or instability in the power supply. When the power turns back on, there can be spikes and variations in the voltage and/or current that can damage electrical devices. Typically, these irregularities only persist for a short period of time before the power supply returns to a consistent supply within safe level of voltage and/or current.

SUMMARY OF THE INVENTION

A power return delay outlet adaptor system prevents damage to electrical devices, such as electrical appliances from power irregularities that often follow a power outage and upon a return of power following the outage. A power return delay outlet adaptor plugs into a power receptacle and has one or more power sockets. At least one power socket of the power return delay outlet adaptor is a power return delay socket that is coupled with a delay on make device. The delay on make device includes a power sensor and a switch that is opened upon the power sensor detecting a power outage to the power return delay outlet adaptor. The open switch prevents power supply to the at least one power return delay socket. The delay on make device then only closes the switch after a delay time following a return of power to the power return delay outlet adaptor. This delay time, which may be at least 10 seconds, or preferably 1 minute or more, three minutes or more, five minutes or more, or even 10 minutes or more prevents damage to the electrical device from power return power irregularities.

A power return delay outlet adaptor may have a plurality of power sockets, such as two or more, three or more, four or more, five or more, six or more, or even eight or more. A portion or all of these power sockets may be power return delay sockets that are coupled with a delay on make device. A single switch may prevent power to one or all of the power return delay sockets for a delay time following a return of power after a power outage.

The delay on make device may include or be coupled with a controller, such as a processor, or microprocessor, and/or a circuit board and the controller may be coupled with the power sensor and initiate a delay timer following a return of power after an outage. The controller may only initiate the delay timer after a power outage is detected by the power sensor and a power return is detected by the power sensor. A power return may require the power to be at least a threshold value of the normal power to the power return delay outlet adaptor, such as at least 75%, at least 85%, at least 90% or at least 95% or 100% of normal or steady state power, such as voltage and or current. This may be a percentage of the voltage, such as 110V, or 220V and the like. The power sensor may measure voltage to the power return delay outlet adaptor. A power outage may be determined by the power sensor to be some threshold value reduction below the normal or steady state value, such as at least 75%, at least 85%, at least 90% or at least 95% or 100% of normal or steady state power, such as voltage and or current. This may be a percentage of the voltage, such as 110V, or 220V and the like.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
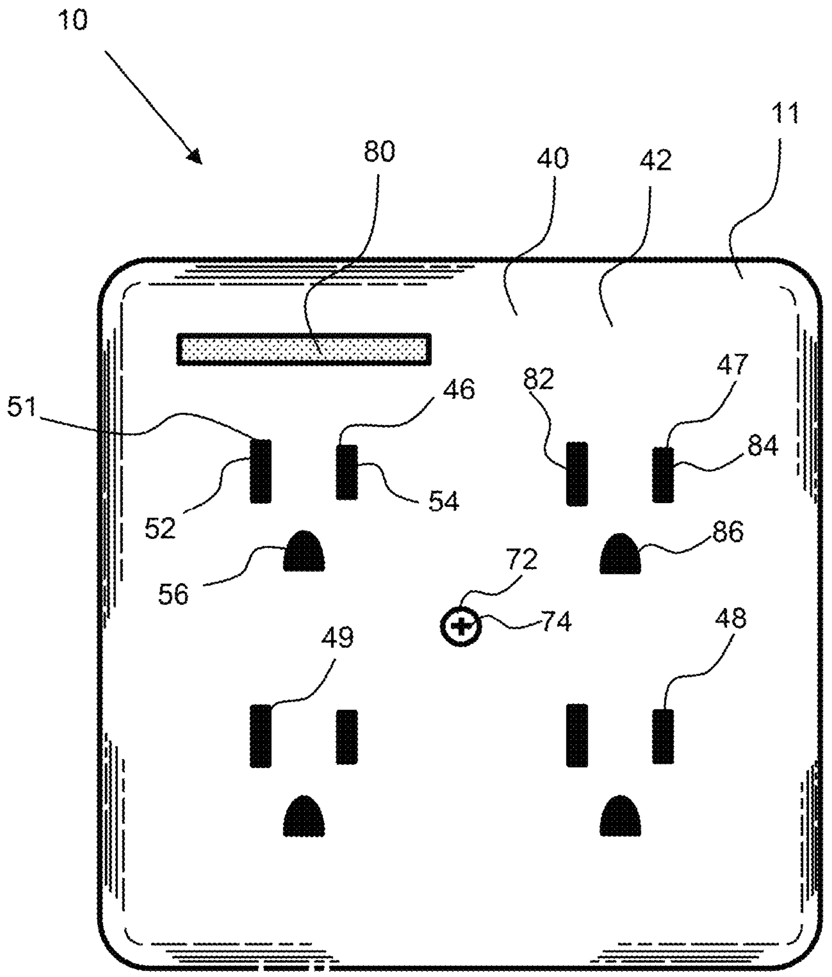
FIG. 1 shows a front view of an exemplary power return delay outlet adaptor system that includes a power return delay outlet adaptor having a plurality of power sockets with at least one power socket being a power return delay socket that is coupled with a delay on make device to delay power supply to this power return delay socket after a return of power from a power source following a power outage.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
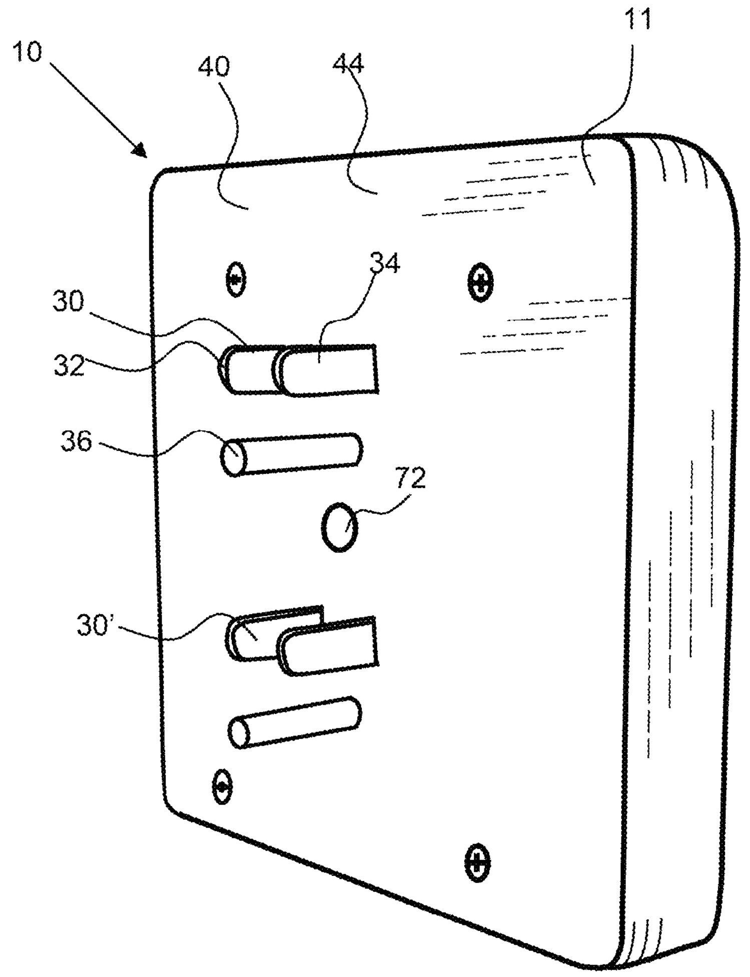
FIG. 2 shows a perspective back view of an exemplary power return delay outlet adaptor system that includes a power return delay outlet adaptor having a plurality of power plugs for coupling with a power receptacle.
Figure 3:
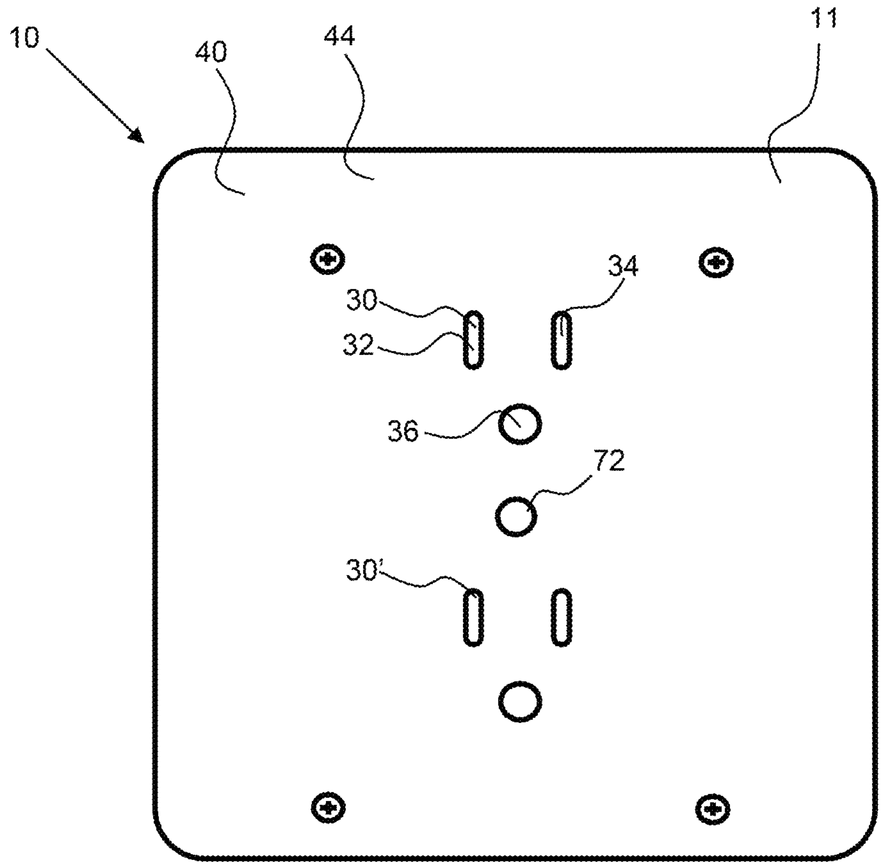
FIG. 3 shows a back view of an exemplary power return delay outlet adaptor system that includes a power return delay outlet adaptor having a plurality of power plugs for coupling with a power receptacle.

Referring now to FIGS. 1 to 3, an exemplary power return delay outlet adaptor system 10 includes a power return delay outlet adaptor 11 having a plurality of power sockets 46, 47, 48 and 49, with the power socket 46 being a power return delay socket 51 that is coupled with a delay on make device to delay power supply to this power return delay socket after a return of power following a power outage. The power return delay socket 51 has a supply socket 52, a return socket 54 and a ground socket 56. Likewise, each of the other power sockets 47, 48 and 49 have a supply socket 82, return socket 84 and ground socket 86. An indicator light 80 is configured to indicate when power is supplied to the power return delay socket 51. FIG. 1 shows the front plate 42 of the housing 40 for the power return delay outlet adaptor 11 which has a fastener aperture 72 for receiving a fastener 74 therein to secure the power return delay outlet adaptor 11 to a power receptacle.

As shown in FIGS. 2 and 3, the power return delay outlet adaptor 11 has a plurality of power plugs 30, 30' for coupling with a power receptacle. Each power plug 30, 30' has a supply plug 32, a return plug 34 and a ground plug 36. The backplate 44 of the housing 40 of the power return delay outlet adaptor 11 is shown in FIG. 2 and has the fastener aperture.

Figure 4:
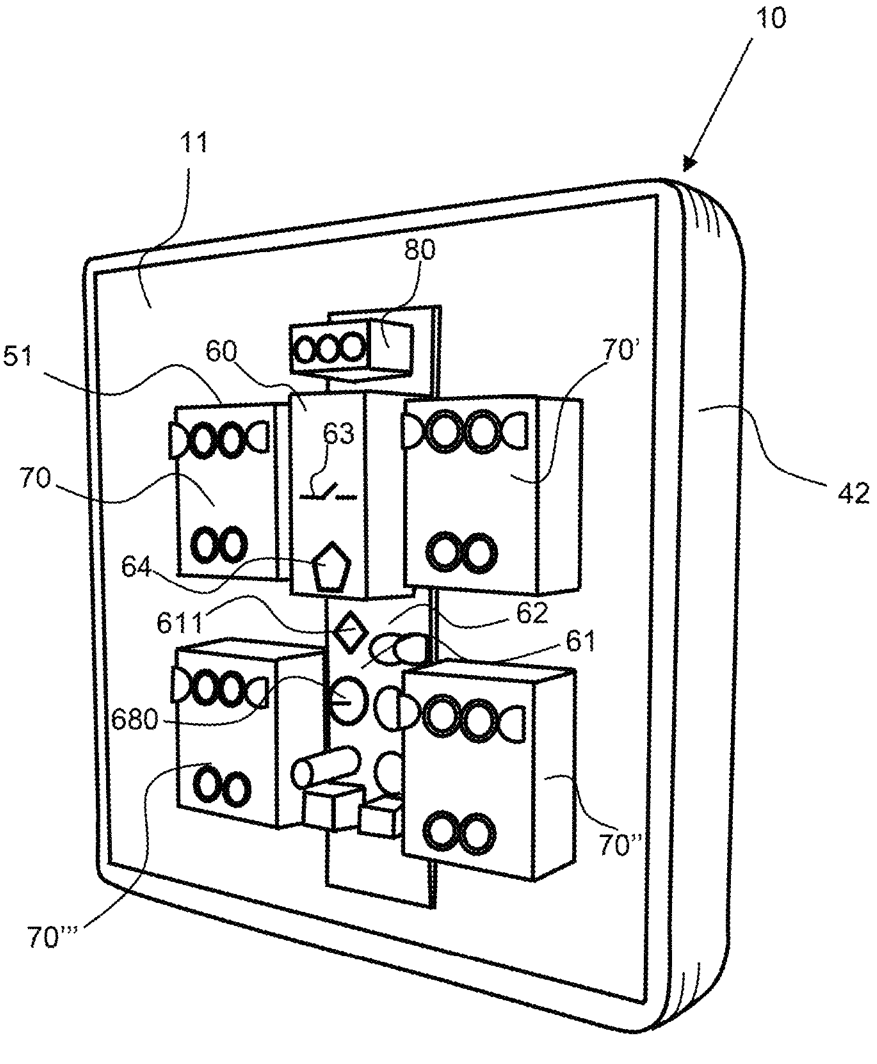
FIG. 4 shows the interior of an exemplary power return delay outlet adaptor that includes delay on make device coupled with at least one power return delay socket.

As shown in FIG. 4, the exemplary power return delay outlet adaptor 11 includes a delay on make device 60 coupled with at least one power return delay socket 51. The delay on make device 60 has a power sensor 64 to detect when there is a power outage and when power is returned and also has a switch 63 to prevent power supply to the power return delay socket 51 until a delay time has lapsed after power has returned following a power outage. A delay timer 680 may be initiated by a controller 61 upon the return of power to the power return delay outlet adaptor following a power outage. The power return delay outlet adaptor 11 has a controller 61, that may include a processor 611, such as a microprocessor and/or a circuit board 62 that controls the power supply to the power return delay socket 51 and may also control power supply to the other power sockets, shown in FIG. 1. The controller may receive input from the power sensor 64 and when the power is returned after an outage, the controller may start a delay timer, and when the delay time is reached, the controller may then close the switch to allow power to return to the power return delay socket. Each power socket has a socket insulator 70 to prevent exposed electrical components.

Figure 5:
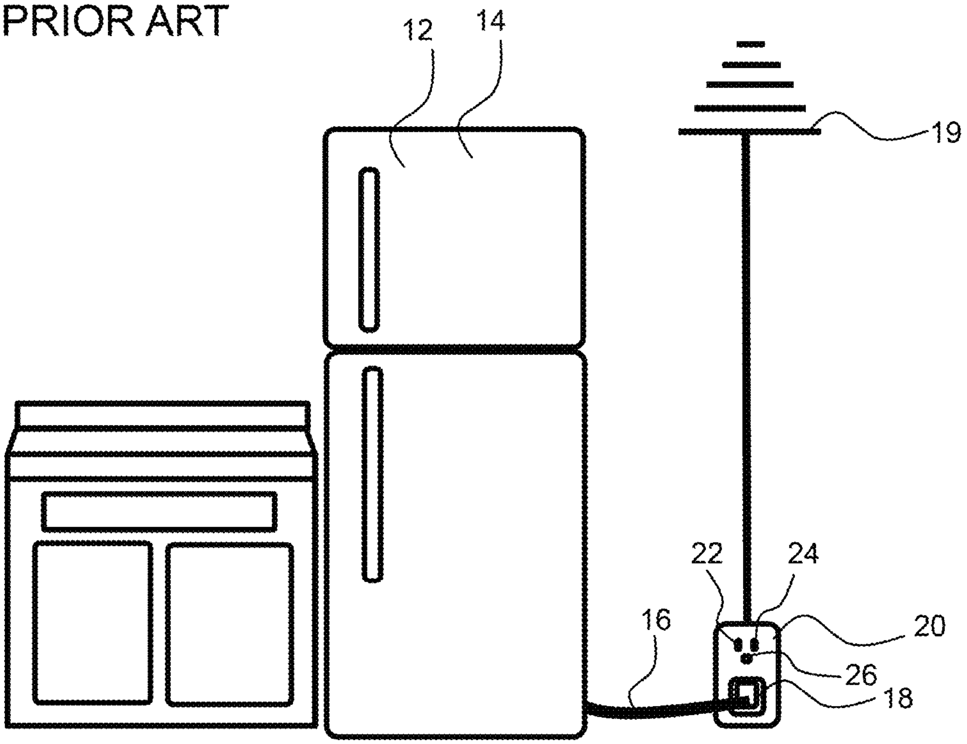
FIG. 5 shows a conventional power supply arrangement to an electrical device, a refrigerator wherein power from a power source is delivered to a power receptacle and wherein a device power plug extends from the refrigerator to the power receptacle to receive power from the power source.

FIG. 5 shows a conventional power supply arrangement to an electrical device 12, an appliance 14, such as a refrigerator, wherein power from a power source 19 is delivered to a power receptacle 20 and wherein a device power cord 16 extends from the refrigerator a device power plug 18 that is plugged into the power receptacle 20 to receive power from the power supply. A power receptacle 20 includes a supply socket 22, a return socket 24 and in some cases a ground socket 26.

Figure 6:
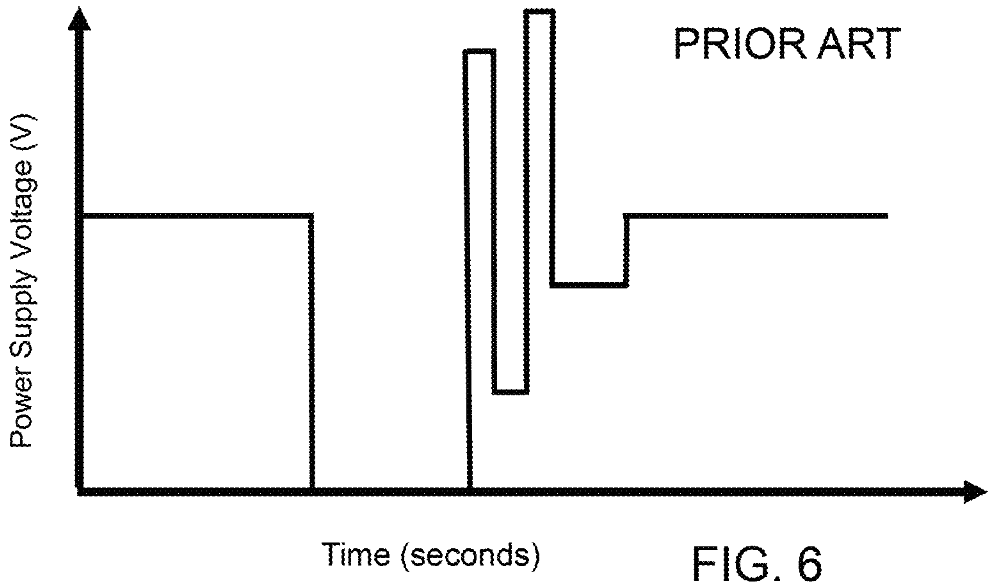
FIG. 6 shows a graph of power versus time over a power outage event and a return of power to the power receptacle, wherein there are irregularities in the power supply when the power is initially returned to the power receptacle.

FIG. 6 shows a graph of power versus time over a power outage event and a return of power to the power receptacle, wherein there are irregularities in the power supply when the power is initially returned to the power receptacle.

Figure 7:
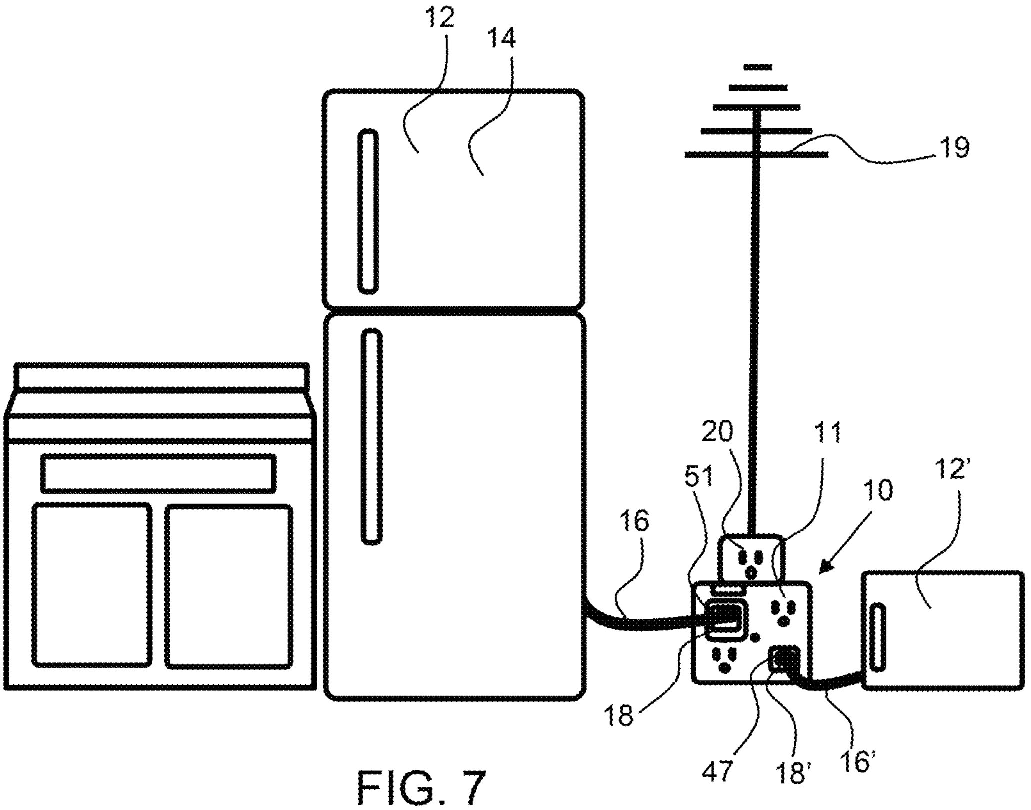
FIG. 7 shows a power supply arrangement incorporating a power return delay outlet adaptor system that includes a power return delay outlet adaptor plugged into the power receptacle and an electrical device, a refrigerator having a device power plug that is plugged into a power return delay socket of the power return delay outlet adaptor.

As shown in FIG. 7, a power supply arrangement to an electrical device 12, at appliance 14, incorporates a power return delay outlet adaptor system 10 that includes a power return delay outlet adaptor 11 plugged into the power receptacle 20 and a device power plug 18 from the refrigerator plugged into power return delay socket 51 of the power return delay outlet adaptor 11. A second electrical device 12' has a second power cord 16' and second device power plug 18' plugged into a second power socket 47 of the power return delay outlet adaptor 11, which may also be a power return delay socket.

Figure 8:
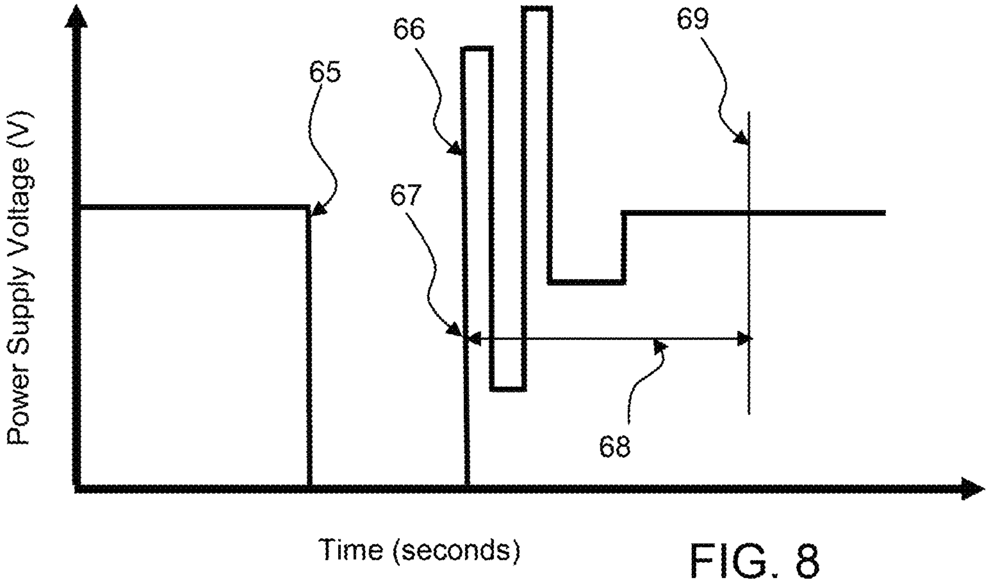
FIG. 8 shows a graph of power versus time over a power outage event and a return of power to the power receptacle, wherein the delay on make device delays power supply from the power source to the power return delay socket of the power return delay outlet adaptor for a delay time from a return of power time.

FIG. 8 shows a graph of power versus time over a power outage event and a return of power to the power receptacle, wherein the delay on make device delays power supply to the power return delay socket 51 shown in FIG. 8, of the power return delay outlet adaptor 11 for a delay time 68 from a return of power time 66. As shown, the start of the power outage 65 is followed by power supply irregularities before the power supply is consistent. The delay start time 67 is the return of power time 66 and the delay end time 69 is following the delay time 68 from the delay start time 67.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A power return delay outlet adaptor system comprising:
a) a power return delay outlet adaptor comprising:
i) a housing having a front plate and a back plate;
ii) a delay on make device configured in said housing;
iii) a plurality of power sockets in said front plate;
wherein at least one of the plurality of power sockets is a power return delay socket that is coupled with said delay on make device;
iv) a power plug comprising a supply plug and a return plug and configured to plug into a power receptacle to receive electrical power from a power source;
v) an indicator light that indicates when power if provided to the power return delay socket from said power source;
wherein the delay on make device comprises:
a power sensor to detect power supply from said power source; and
a switch to prevent power supply from the power source to the at least one power return delay socket for a delay time following a return of power supply from the power source after a power outage.

2. The power return delay outlet adaptor system of claim 1, wherein the delay time is between 15 seconds and 10 minutes.

3. The power return delay outlet adaptor system of claim 1, wherein the delay time is at least 3 minutes.

4. The power return delay outlet adaptor system of claim 1, wherein the delay time is at least 5 minutes.

5. The power return delay outlet adaptor system of claim 1, wherein a power outage is a drop in voltage from a power supply of at least 75%.

6. The power return delay outlet adaptor system of claim 1, wherein the plurality of power sockets of the power return delay outlet adaptor comprises two power sockets.

7. The power return delay outlet adaptor system of claim 6 wherein each of the two power sockets are power return delay sockets.

8. The power return delay outlet adaptor system of claim 1, wherein the plurality of power sockets of the power return delay outlet adaptor comprises four power sockets.

9. The power return delay outlet adaptor system of claim 8, wherein at least two of the four power sockets are power return delay sockets.

10. The power return delay outlet adaptor system of claim 1, wherein the indicator light is configured on the front plate of the housing.

11. A power return delay outlet adaptor system comprising:
a) a power return delay outlet adaptor comprising:
i) a housing having a front plate and a back plate;
ii) a delay on make device configured in said housing;
iii) a plurality of power sockets in said front plate;
wherein at least one of the plurality of power sockets is a power return delay socket that is coupled with said delay on make device;
iv) a power plug comprising a supply plug and a return plug and configured to plug into a power receptacle to receive electrical power from a power source;
v) an indicator light that indicates when power if provided to the power return delay socket from said power source;
wherein the delay on make device comprises:
a power sensor to detect power supply from said power source; and
a switch to prevent power supply from the power source to the at least one power return delay socket for a delay time following a return of power supply from the power source after a power outage;
wherein the delay time is at least 3 minutes;
wherein a power outage is a drop in voltage from a power supply of at least 75%; and
wherein the plurality of power sockets of the power return delay outlet adaptor comprises two power sockets.

12. The power return delay outlet adaptor system of claim 11, wherein each of the two power sockets are power return delay sockets.

13. The power return delay outlet adaptor system of claim 11, wherein the plurality of power sockets of the power return delay outlet adaptor comprises four power sockets.

14. The power return delay outlet adaptor system of claim 13, wherein at least two of the four power sockets are power return delay sockets.

15. The power return delay outlet adaptor system of claim 1, wherein the indicator light is configured on the front plate of the housing.

16. A method of delaying power to an electrical device after a return of power following a power outage, said method comprising:
a) providing said electrical device comprising a device power plug;
b) a power receptacle that receives electrical power from a power source;
c) providing a power return delay outlet adaptor system comprising:
i) a power return delay outlet adaptor comprising:
a housing having a front plate and a back plate;
a delay on make device configured in said housing;
a plurality of power sockets in said front plate;
wherein at least one of the plurality of power sockets is a power return delay socket that is coupled with said delay on make device;
a power plug comprising a supply plug and a return plug and configured to plug into said power receptacle to receive electrical power from said power source;
wherein the delay on make device comprises:
a power sensor to detect power supply from said power source; and
a switch to prevent power supply from the power source to the at least one power return delay socket for a delay time of at least 3 minutes following a return of power supply from the power source after a power outage;
an indicator light that indicates when power if provided to the power return delay socket from said power source;
d) plugging the power plug of the power return delay outlet adaptor into the power receptacle;
e) plugging the device power plug into the power return delay socket of the power return delay outlet adaptor;
wherein after a return of power following a power outage of the power source;
f) opening said switch; and
g) after said delay time of at least 3 minutes, closing said switch to reestablish power supply to the at least one power return delay socket.

17. The method of claim 16, further comprising plugging a second electrical device into a second power socket of said plurality of power sockets.

18. The method of claim 16, wherein the power return delay outlet adaptor system comprises a controller and wherein the controller initiates a delay timer for measuring the delay time.

19. The method of claim 16, wherein a power outage is a drop in voltage from a power supply of at least 75%.

20. The method of claim 16, wherein the plurality of power sockets of the power return delay outlet adaptor comprises two power return delay sockets.

* * * * *